(12) United States Patent
Choi et al.

(10) Patent No.: US 11,520,408 B2
(45) Date of Patent: Dec. 6, 2022

(54) VEHICLE DISPLAY APPARATUS

(71) Applicant: LG Electronics Inc., Seoul (KR)

(72) Inventors: Biseok Choi, Seoul (KR); Yoonkyoung Kim, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 17/295,207

(22) PCT Filed: Nov. 19, 2018

(86) PCT No.: PCT/KR2018/014164
§ 371 (c)(1),
(2) Date: May 19, 2021

(87) PCT Pub. No.: WO2020/105742
PCT Pub. Date: May 28, 2020

(65) Prior Publication Data
US 2021/0389824 A1 Dec. 16, 2021

(51) Int. Cl.
*G06F 3/01* (2006.01)
*B60K 35/00* (2006.01)

(52) U.S. Cl.
CPC .............. *G06F 3/016* (2013.01); *B60K 35/00* (2013.01); *B60K 2370/152* (2019.05); *B60K 2370/158* (2019.05)

(58) Field of Classification Search
CPC combination set(s) only.
See application file for complete search history.

(56) References Cited

U.S. PATENT DOCUMENTS

| | | | | |
|---|---|---|---|---|
| 2010/0013614 A1* | 1/2010 | Sproelich | ................ | H02K 3/50 310/12.26 |
| 2014/0028573 A1* | 1/2014 | Olien | ..................... | H01L 41/35 29/25.35 |
| 2014/0232683 A1* | 8/2014 | Morishita | ............. | G06F 3/0445 345/174 |
| 2015/0145783 A1* | 5/2015 | Redelsheimer | ....... | G06F 1/1643 345/173 |
| 2016/0195931 A1* | 7/2016 | Czelnik | ................... | G06F 3/016 345/173 |
| 2017/0033673 A1* | 2/2017 | Wang | ..................... | H02K 33/16 |
| 2018/0336985 A1* | 11/2018 | Kato | ....................... | H01F 7/081 |
| 2020/0136488 A1* | 4/2020 | Takahashi | ............. | H02K 33/06 |
| 2021/0023586 A1* | 1/2021 | Kondou | ................ | B60K 37/02 |

FOREIGN PATENT DOCUMENTS

| | | | | |
|---|---|---|---|---|
| CN | 101702564 A | * | 5/2010 | ............... H02K 3/50 |
| CN | 209013594 U | * | 6/2019 | |
| CN | 209216481 U | * | 8/2019 | |
| CN | 112009258 A | * | 12/2020 | |
| EP | 3136573 A1 | * | 3/2017 | ............. B06B 1/045 |

(Continued)

*Primary Examiner* — Chico A Foxx
(74) *Attorney, Agent, or Firm* — Fish & Richardson P.C.

(57) ABSTRACT

The present disclosure relates to a vehicle display apparatus including: a display case; an arm plate elastically coupled to the display case; and a solenoid module, wherein the solenoid module includes: a moving core formed in a rod shape, and having both ends fixed to the arm plate; and a base core being elastically coupled to the display case, and having a coil formed therein which is wound in one direction to surround at least a portion of the moving core.

18 Claims, 15 Drawing Sheets

(56) References Cited

FOREIGN PATENT DOCUMENTS

| EP | 3557382 A1 | * | 10/2019 | ............ | G06F 3/016 |
| EP | 3570143 A1 | * | 11/2019 | ............ | B06B 1/045 |
| JP | 2011110986 A | * | 6/2011 | | |
| JP | 2017029972 A | * | 2/2017 | ............ | H02K 33/16 |
| JP | 2019188285 A | * | 10/2019 | ............ | G06F 3/016 |
| KR | 101084800 B1 | * | 11/2011 | | |
| WO | WO-2007096167 A1 | * | 8/2007 | ............ | A61C 17/34 |
| WO | WO-2010068544 A1 | * | 6/2010 | ............ | G06F 3/016 |

\* cited by examiner

VEHICLE DISPLAY APPARATUS

CROSS-REFERENCE TO RELATED APPLICATIONS

This application is a National Stage application under 35 U.S.C. § 371 of International Application No. PCT/KR2018/014164, filed on Nov. 19, 2018. The disclosure of the prior application is incorporated by reference in its entirety.

TECHNICAL FIELD

The following description relates to a vehicle display apparatus.

BACKGROUND ART

A vehicle is a machine that moves in a direction desired by a user riding therein. A representative example of the vehicle is an automobile. The automobile includes a display device as a Human Machine Interface (HMI) device. A vehicle display apparatus may be used even while driving, such that a haptic function should be implemented for a user to recognize that a touch input is performed.

Meanwhile, the vehicle display apparatus becomes increasingly larger in size to provide more information to users.

There is a problem, however, in that if a piezo and the like used to implement an existing haptic function are used for the larger-sized vehicle display apparatus, sufficient haptic feedback may not be provided.

DISCLOSURE OF INVENTION

Technical Problem

In order to solve the above problem, it is an object of the present disclosure to provide a vehicle display apparatus capable of providing sufficient haptic feedback.

The objects of the present disclosure are not limited to the aforementioned object, and other objects not described herein will be clearly understood by those skilled in the art from the following description.

Technical Solution

In accordance with an aspect of the present disclosure, the above and other objects can be accomplished by providing a vehicle display apparatus, including: a display case; an arm plate elastically coupled to the display case; and a solenoid module, wherein the solenoid module includes: a moving core formed in a rod shape, and having both ends fixed to the arm plate; and a base core being elastically coupled to the display case, and having a coil formed therein which is wound in one direction to surround at least a portion of the moving core.

Other detailed matters of the exemplary embodiments are included in the detailed description and the drawings.

Advantageous Effects

The present disclosure has one or more of the following effects.

First, a solenoid module is used to provide haptic feedback, such that sufficient haptic feedback may be provided even for a vehicle display apparatus having a relatively large size.

Second, a moving core and a base core, each having no fixing portion, are coupled via a spring inside the vehicle display apparatus, thereby providing sufficient haptic feedback without occupying a large volume.

The effects of the present disclosure are not limited to the aforesaid, and other effects not described herein will be clearly understood by those skilled in the art from the following description of the appended claims.

BEST MODE FOR CARRYING OUT THE INVENTION

Figure 1:
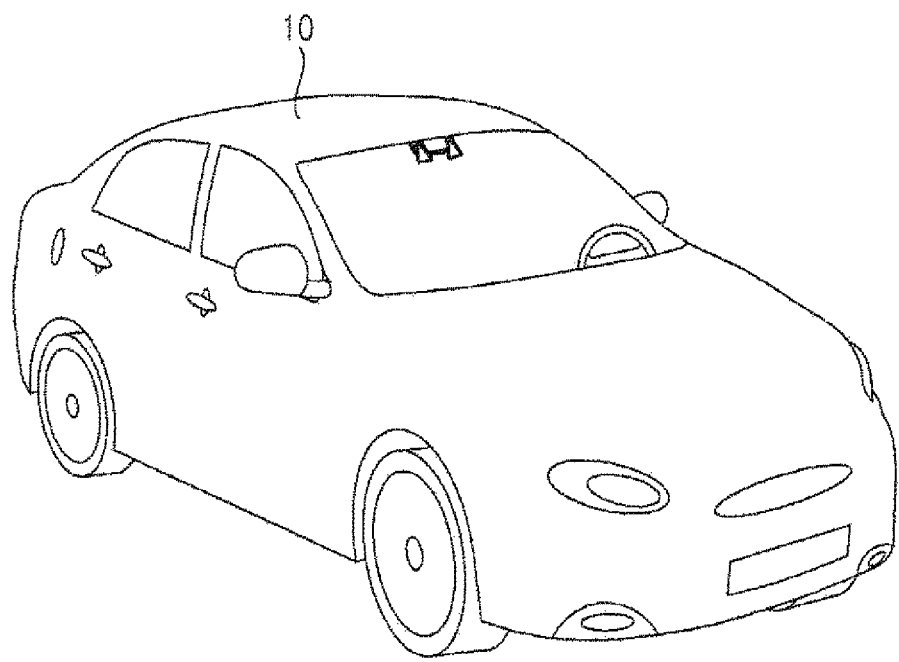
FIG. 1 is a diagram illustrating the appearance of a vehicle according to an embodiment of the present disclosure.
Figure 1:
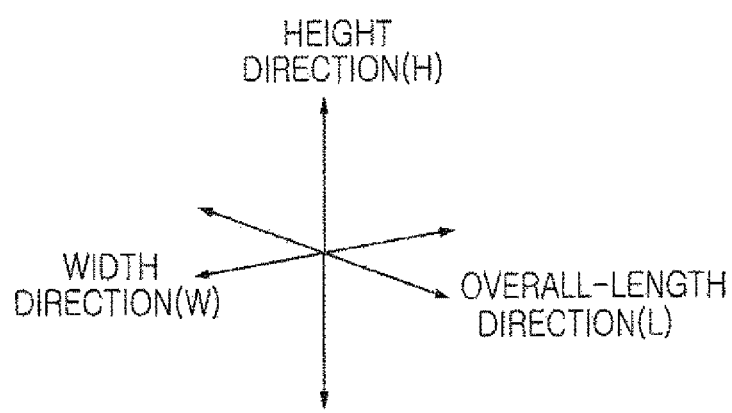

Reference will now be made in detail to embodiments of the disclosure, examples of which are illustrated in the accompanying drawings. The same reference numerals are used throughout the drawings to designate the same or similar components, and a redundant description thereof will be omitted. The suffixes "module" and "unit" of elements herein are used for convenience of description and do not have any distinguishable meanings or functions. Further, it will be noted that a detailed description of known arts will be omitted if it is determined that the detailed description of the known arts can obscure the embodiments of the invention. In addition, the accompanying drawings are used to help easily understand various technical features, and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that, although the terms first, second, etc., may be used herein to describe various elements, these elements should not be limited by these terms. These terms are only used to distinguish one element from another.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

As used herein, the singular forms are intended to include the plural forms as well, unless the context clearly indicates otherwise.

It should be understood that the terms "include," "have," etc. when used in this specification specify the presence of stated features, integers, steps, operations, elements, components, or combinations thereof, but do not preclude the presence or addition of one or more other features, integers, steps, operations, elements, components, or combinations thereof.

FIG. 1 is a diagram illustrating the appearance of a vehicle according to an embodiment of the present disclosure.

Figure 2:
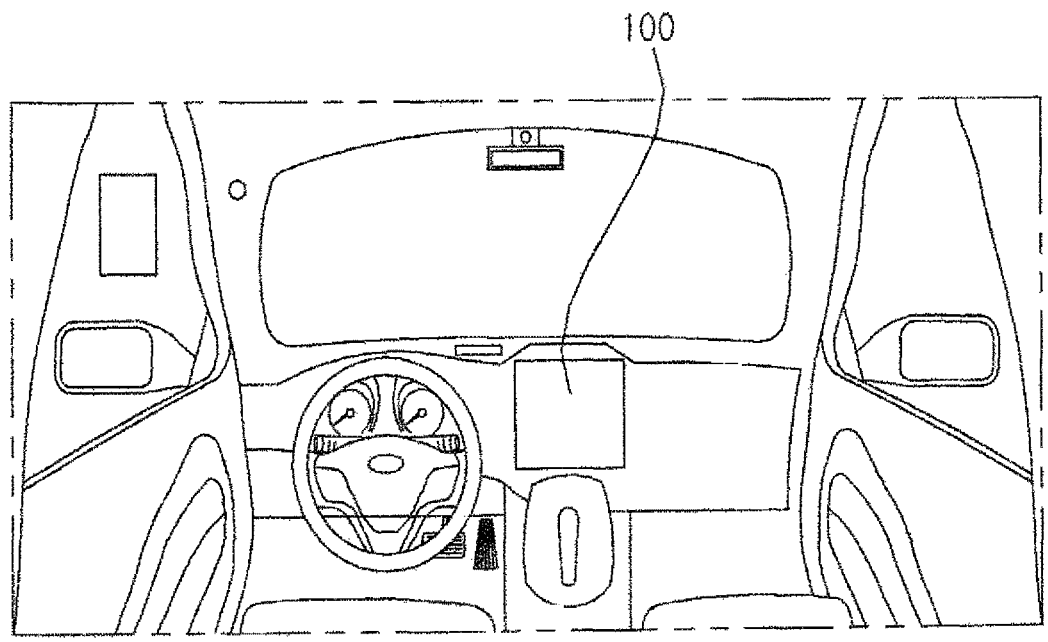
FIG. 2 is a diagram illustrating a vehicle display apparatus according to an embodiment of the present disclosure.

FIG. 2 is a diagram illustrating a vehicle display apparatus according to an embodiment of the present disclosure.

Referring to FIGS. 1 and 2, a vehicle 10 may be a concept that covers all of an internal combustion engine vehicle including an engine as a power source, a hybrid vehicle including both an engine and an electric motor as power sources, and an electric vehicle including an electric motor as a power source, and the like. The vehicle 10 may be an autonomous vehicle.

The vehicle 10 may include a vehicle display apparatus 100. The vehicle display apparatus 100 is one of Human Machine Interface (HMI) devices, and may receive a user input and may output content through the display 110. Meanwhile, the display (110 of FIG. 5) may be implemented as a touch screen. In this case, the vehicle display apparatus 100 may receive a user input and may output content through the touch screen.

The vehicle display apparatus 100 may provide haptic feedback. For example, upon receiving a user's touch input, the vehicle display apparatus 100 may provide haptic feedback so that the user may recognize that the touch input is performed. Hereinafter, the vehicle display apparatus 100 providing haptic feedback will be described in further detail.

Figure 3:
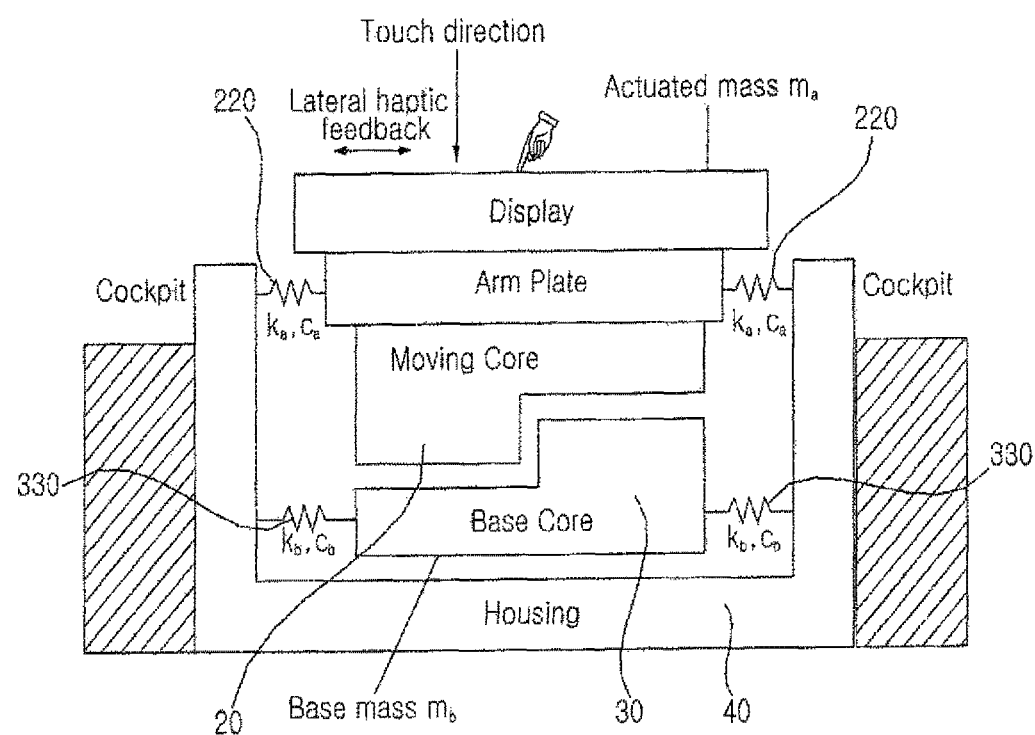
FIG. 3 is a diagram schematically illustrating a vehicle display apparatus according to an embodiment of the present disclosure.

FIG. 3 is a diagram schematically illustrating a vehicle display apparatus according to an embodiment of the present disclosure.

Referring to FIG. 3, an operation unit 20, a base unit 30, and a housing 40 may be included. The operation unit 30 may be elastically coupled to the housing 40. For example, the operation unit 30 may be coupled to the housing 40 via at least one first spring 220. The base unit 30 may be elastically coupled to the housing 40. For example, the base unit 30 may be coupled to the housing 40 via at least one second spring 330.

The vehicle display apparatus 100 may include a solenoid module (300 of FIG. 6A), and a moving core (320 of FIG. 6A) of the solenoid module may be included in the operation unit 30 and a base core (310 of FIG. 6A) of the solenoid module may be included in the base unit 30. As a magnetic force, generated when the solenoid module is in operation, causes the moving core and the base core to vibrate, haptic feedback may be provided.

The vehicle display apparatus 100 may include at least one processor. The processor may receive a signal generated by a force sensor (240 of FIG. 5). When a user touches a display 110, the force sensor may sense touch pressure. Upon sensing the touch pressure, the force sensor may generate an electrical signal and may provide the electrical signal to the processor.

The processor may control the solenoid module based on the signal provided by the force sensor. Upon receiving the signal from the force sensor, the processor may control the solenoid module to provide a haptic effect in a predetermined pattern. The processor may supply a current to a coil in the solenoid module according to the signal received from the force sensor.

The solenoid module may generate a magnetic force under the control of the processor. The solenoid module may change a direction of the magnetic force generated based on the supplied current. If the direction of the magnetic force is changed, a movement direction of the moving core and the base core may be changed. If the direction of the magnetic force is changed at predetermined intervals, the movement direction of the moving core and the base core may also be changed at predetermined intervals. As the movement direction of the moving core and the base core is changed at predetermined intervals, vibrations occur such that a haptic function may be implemented.

Figure 4:
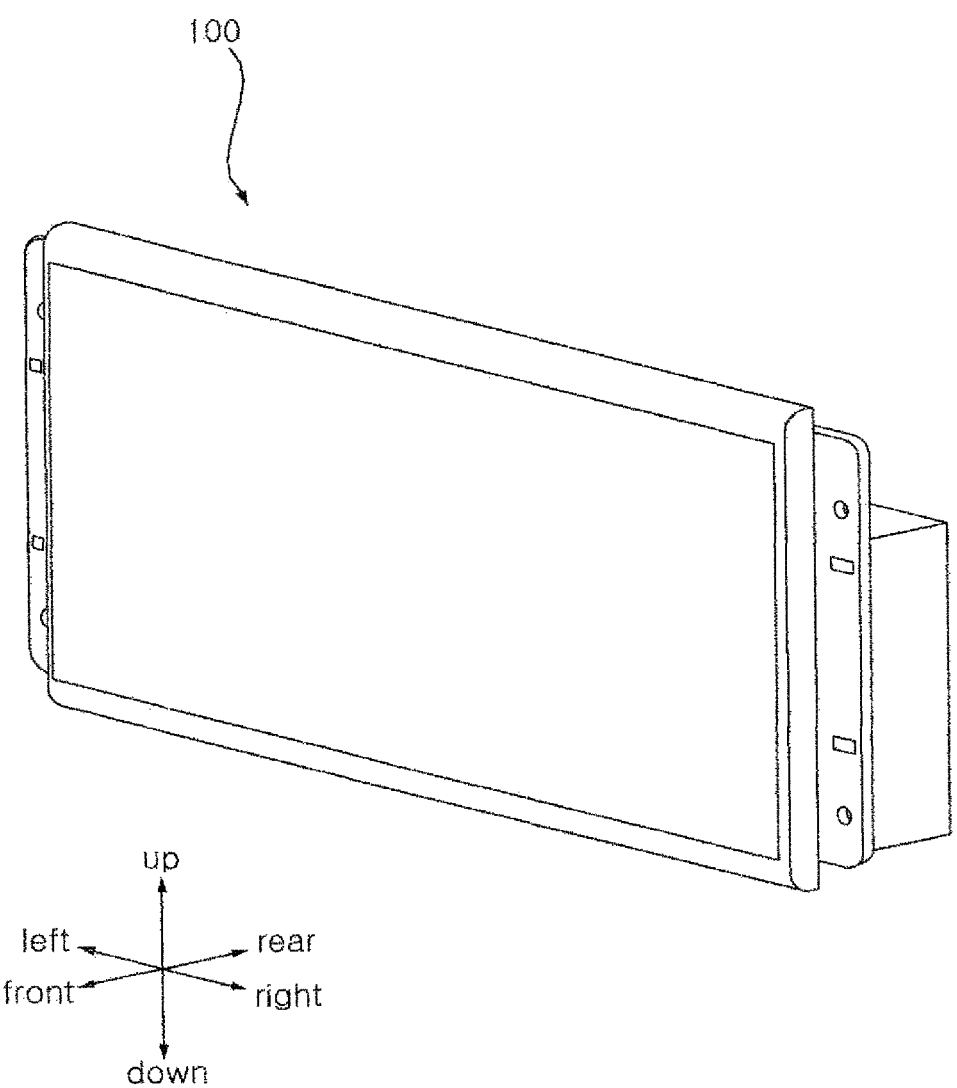
FIG. 4 is a view, as seen from a specific direction, of a vehicle display apparatus according to an embodiment of the present disclosure.

FIG. 4 is a view, as seen from a specific direction, of a vehicle display apparatus according to an embodiment of the present disclosure.

Figure 5:
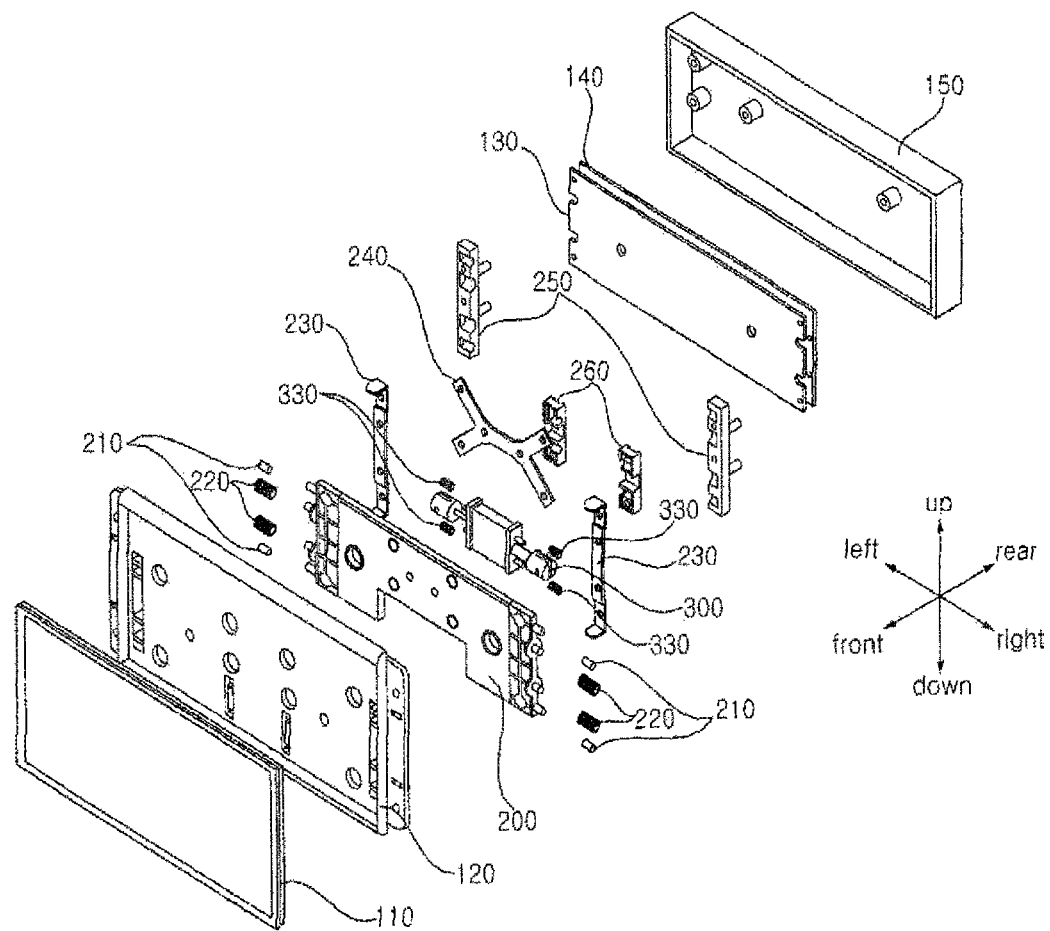
FIG. 5 is an exploded perspective view of a vehicle display apparatus according to an embodiment of the present disclosure.

FIG. 5 is an exploded perspective view of a vehicle display apparatus according to an embodiment of the present disclosure.

Figure 6A:
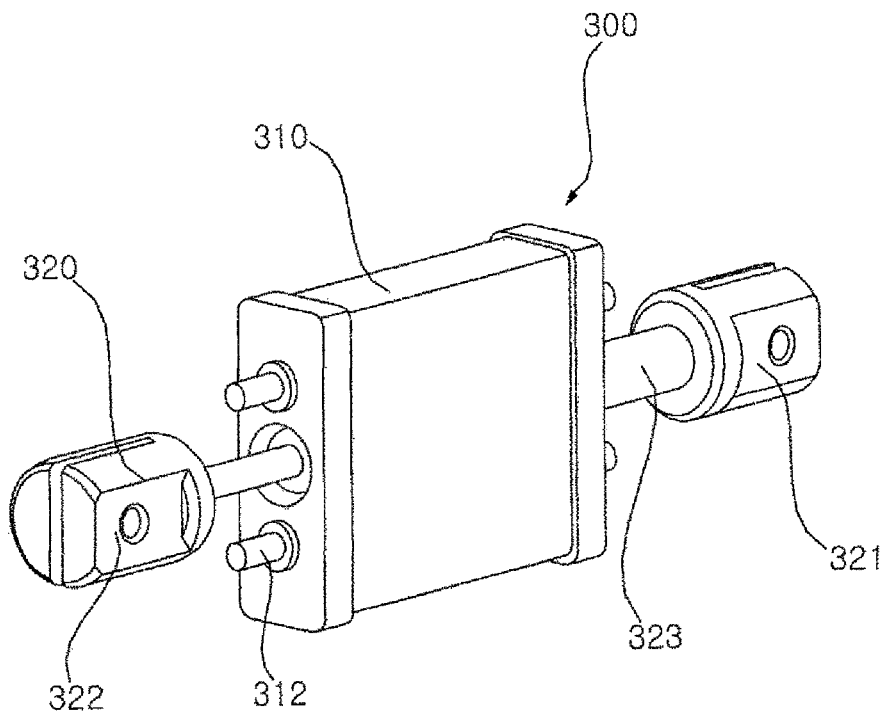
FIGS. 6A and 6B are diagrams illustrating a solenoid module according to an embodiment of the present disclosure.
Figure 6B:
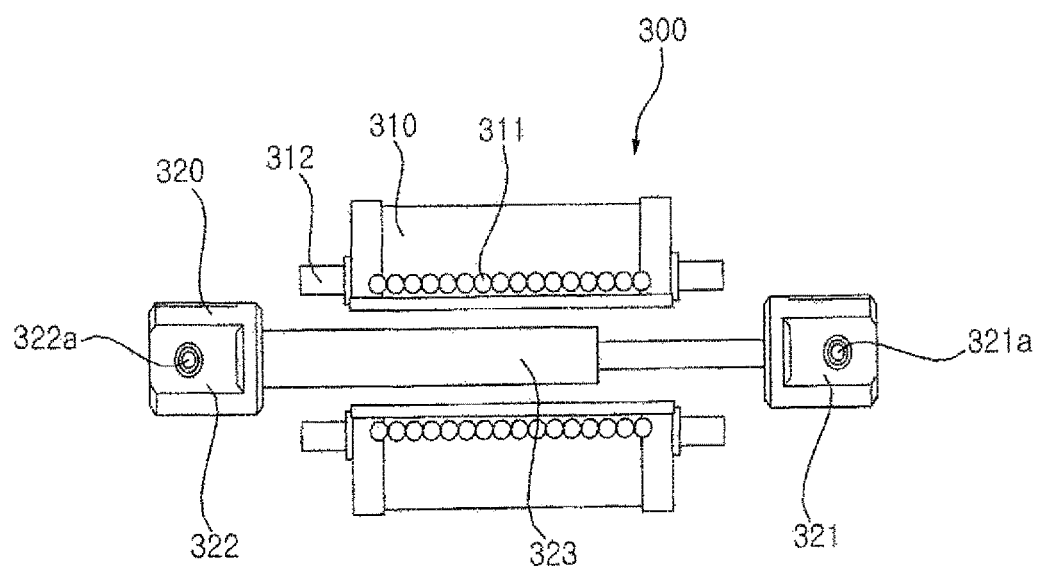

FIGS. 6A and 6B are diagrams illustrating a solenoid module according to an embodiment of the present disclosure.

Figure 7A:
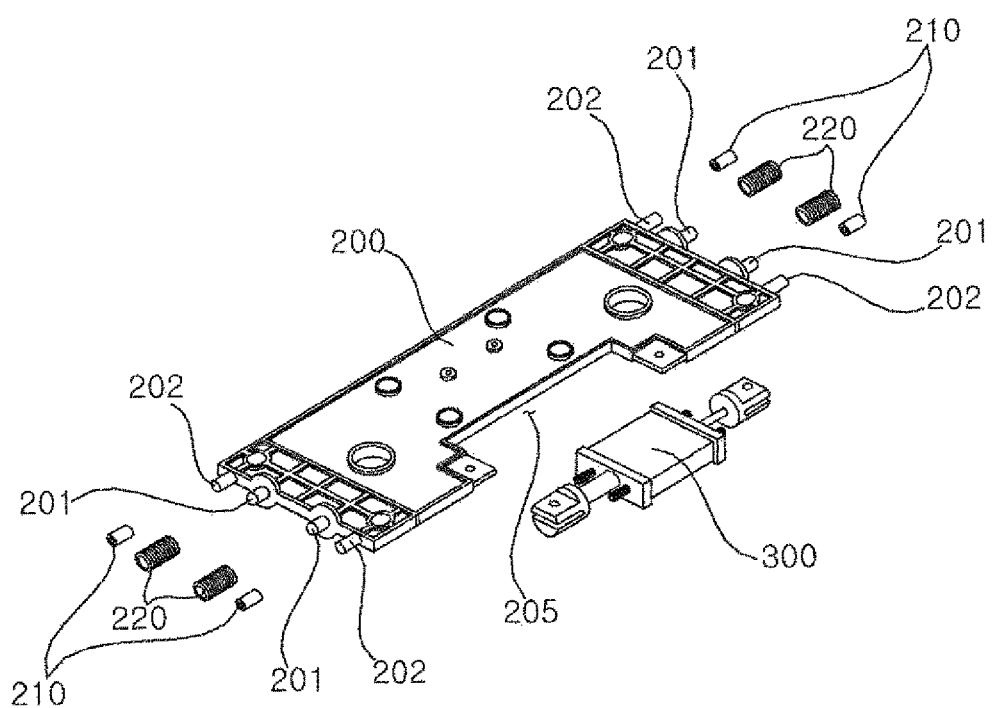
FIGS. 7A and 7B are diagrams referred to in the description of various components coupled to an arm plate according to an embodiment of the present disclosure.
Figure 7B:
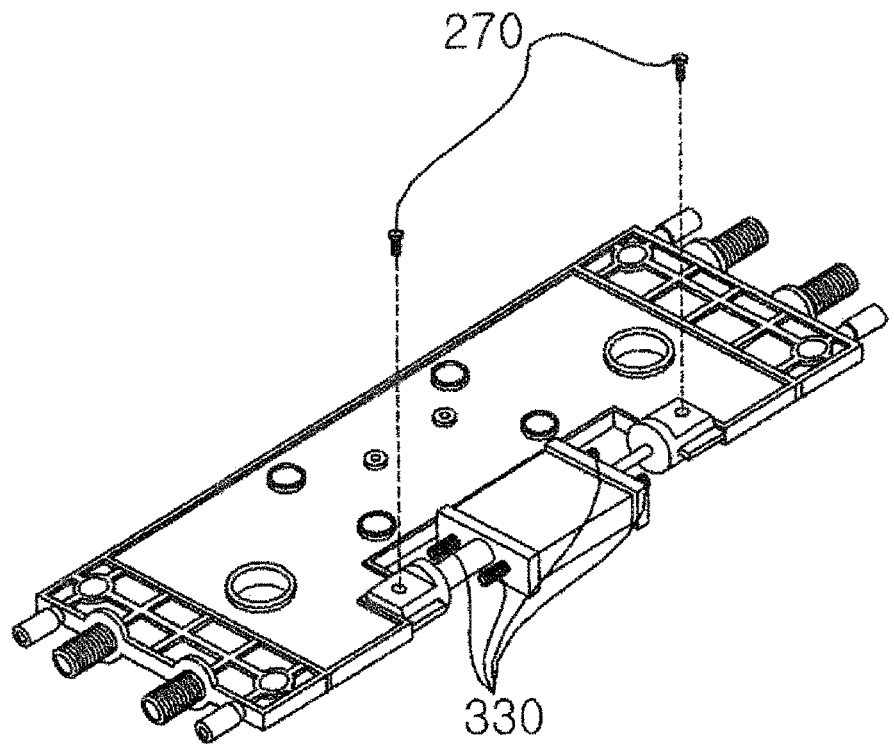

FIGS. 7A and 7B are diagrams referred to in the description of various components coupled to an arm plate according to an embodiment of the present disclosure.

Referring to the drawings, the vehicle display apparatus 100 may include a display 110, a display case 120, an arm plate 200, a solenoid module 300, at least one first spring 220, at least one bushing 220, at least one second spring 330, at least one leaf spring 230, a force sensor 240, a first rail cover 250, a second rail cover 260, a first PCB 130, a second PCB 140, and a rear cover 150. Depending on embodiments, some of the above components may be omitted from the vehicle display apparatus 100 or other components may be further included therein.

Meanwhile, the display 110, the arm plate 200, and the moving core of the solenoid module 300 may be classified as subcomponents of the operating unit 20. The base core of the solenoid module 300 may be classified as a subcomponent of the base unit 30 of FIG. 3. The display case 120 and the rear cover 150 may be classified as subcomponents of the housing 40 of FIG. 3.

The display 110 may display a graphic object. The display 110 may be implemented as at least one of a liquid crystal display (LCD), a thin film transistor-liquid crystal display (TFT LCD), an organic light-emitting diode (OLED), a flexible display, a 3D display, and an e-ink display, but is preferably implemented as an LCD display. A touch screen may be implemented as the display 110 may form a layered structure with a touch sensor or may be integrally formed with the touch sensor.

The display 110 may be seated on the display case 120. The display 110 may be coupled to the display case 120 in various manners. For example, the display 110 may be coupled to the display case 120 by bonding, bolting, snap-fitting, and the like.

The display 110 may have at least one boss formed on a rear surface. A front surface of the display 110 may be defined as a surface on which a graphic object is displayed. The rear surface of the display 110 may be defined as a surface directed toward the rear cover 150. For example, at least one first boss and at least one second boss may be formed on the rear surface of the display 110.

The display case 120 may be coupled to the display 110. The display case 120 may support the display 110, and may protect the display 10 from an external impact.

The display case 120 may have a connection relationship with various components of the vehicle display apparatus 100. The display case 120 may be elastically coupled to the arm plate 200. For example, the display case 120 may be coupled to the arm plate 200 via the at least one first spring 220. The display case 120 may be elastically coupled to the moving core 320 of the solenoid module 300.

Meanwhile, a front surface of the display case 120 may be defined as a surface directed toward the display 110. A rear surface of the display case 120 may be defined as a surface directed toward the rear cover 150.

A first groove, in which the first spring 220 is received, may be formed on the rear surface of the display case 120. The first groove may form a first rail, in which the first spring 220 is received, together with a groove formed on the first rail cover 250.

A second groove, in which the second spring 330 is received, may be formed on the rear surface of the display case 120. The second groove may form a second rail, in which the second spring 330 is received, together with a groove formed on the second rail cover 260.

The display case 120 may have at least one hole, through which at least one boss formed on the rear surface of the display 110 passes through.

The arm plate 200 may mediate the coupling between the solenoid module 300 and the display case 120. The arm plate 200 may have a plate shape. A groove (or a slot or a recess) for receiving the solenoid module 300 may be formed on a portion of the arm plate 200. The arm plate 200 may be coupled to the moving core 320 while the base core 310 is received in the groove.

The arm plate 200 may be elastically coupled to the display case 120. The arm plate 200 may include at least one protruding part extending outwardly from a lateral side. The first spring 220 may be inserted into at least one first protruding part formed on the lateral side of the arm plate 200.

The bushing 210 may be coupled to the arm plate 200. The arm plate 200 may include at least one second protruding part extending outwardly from the lateral side. The bushing 210 may be inserted into at least one second protruding part formed on the lateral side of the arm plate 200.

The arm plate 200 may have at least one hole which is formed on the rear surface of the display 110, and through which at least one boss passes through.

The solenoid module 300 may generate a magnetic force using a supplied current. The solenoid module 300 may change a magnitude and direction of the magnetic force according to a change in the supplied current. Vibrations may occur according to the magnitude and direction of the magnetic force generated by the solenoid module 300. A haptic function may be implemented by the vibrations generated by the solenoid module 300.

Referring to FIGS. 6A and 6B, the solenoid module 300 may include the moving core 320 and the base core 310.

The moving core 320 may pass through the base core 310. The moving core 320 may have a rod shape. The moving core 320 may be fixed to the arm plate 200.

The moving core 320 may include a shaft 323, a first head 321, and a second head 322. The shaft 323 may pass through the base core 310. The first head 321 may extend from one end of the shaft 323 and may be fastened to the arm plate 200. The second head 322 may extend from the other end of the shaft 322 and may be fastened to the arm plate 200.

The moving core 320 may vibrate based on a current flowing through the coil 311. The arm plate 200 coupled to the moving core 320 may be connected to the display case 120 via at least one first spring 220. When a horizontal force is exerted on the moving core 320, the horizontal force is also applied to the arm plate 200. In the case where the horizontal force is applied to the arm plate 200, a pair of left and right first springs 220 may be alternately compressed/expanded, such that the arm plate 200, to which the moving core 320 is coupled, may vibrate.

Meanwhile, the moving core 320 may be formed of a metal material reacting to the magnetic force.

The base core 310 may include a coil 311 wound in one direction so as to surround at least a portion of the moving core 320. The coil 311 included in the base core 310, may be wound to surround the shaft 323. A current may flow through the coil 311. A magnetic force may be generated by the current flowing through the coil 311.

The base core 310 may be elastically coupled to the display case 120. The base core 310 may have at least one protruding part 312 extending outwardly from a lateral side. The second spring 330 may be inserted into at least one first protruding part 312 formed on the lateral side of the base core 310.

The base core 310 may vibrate in a direction opposite to a movement direction of the moving core 320. The base core 310 may be coupled to the display case 120 via the second spring 330. In the case where a horizontal force is applied to the base core 310, a pair of left and right second springs 330 may be alternately compressed/expanded, such that the base core 310 may vibrate.

Referring to FIGS. 7A and 7B, the moving core 310 may be received in a groove 205 formed in the arm plate 200. While the moving core 310 is received in the groove 205, the first head 321 and the second head 322 may be coupled to at least a portion of the arm plate 200. The first head 321 may be coupled to the arm plate 200 via a hole 321a formed in the first head 321 and a bolt 270 passing through the hole formed in the arm plate 200. The second head 322 may be coupled to the arm plate 200 via a hole 322a formed in the second head 322 and the bolt 270 passing through the hole formed in the arm plate 200.

At least a pair of left and right first springs 220 may be provided. The first spring 220 may be inserted into the first protruding part 201 extending outwardly from the lateral side of the arm plate 200. The first spring 220 may come into contact with the arm plate 200 and the display case 120. One end of the first spring 220 may come into contact with the lateral side of the arm plate 200. The other end of the first spring 220 may come into contact with a cross section formed on a rear surface of the display case 120. Here, the cross section may be understood as a surface defining the end of the first groove.

The first spring 220 may be disposed in a left-right direction. The first spring 220 may be formed on the first rail. The first rail may be formed as the first rail cover 250 is coupled to the display case 120. The first rail may be formed by the first groove, formed on the rear surface of the display case 120, and the groove formed on the first rail cover 250.

The first spring 220 may be compressed and expanded by the moving core 320 and the arm plate 200 which move based on the current flowing through the coil 311. The first spring 220 may be compressed and expanded relative to the second spring 330. For example, the first spring 220 may be expanded when the second spring 330 corresponding thereto is compressed. The first spring 220 may be compressed when the second spring corresponding thereto is expanded.

A natural frequency of the first spring 220 may be equal to a natural frequency of the second spring 330. As the first spring 220 and the second spring 330 have the same natural frequency, uniform vibration may be generated. The natural frequency of the first spring 220 is determined based on a mass of the operation unit 20, which is borne by the first spring 220, and based on a spring constant of the first spring 220; and the natural frequency of the second spring 330 is determined based on a mass of the base unit 30, which is borne by the second spring 330, and based on a spring constant of the second spring 330. By adjusting the spring constant of the first spring 220 and the spring constant of the second spring 330 while the mass of the operation unit 20 and the mass of the base unit 30 are determined, the natural frequency of the first spring 220 may be matched to the natural frequency of the second spring 330.

At least a pair of left and right bushings 210 may be provided. The bushing 210 may be inserted into a second protruding part 202 extending outwardly from a lateral side of the arm plate 200. The bushing 210 may suppress torque from being generated in the arm plate 200.

At least a pair of left and right second springs 330 may be provided. The second spring 330 may be inserted into the protruding part 312 extending outwardly from the lateral side of the base core 310, and may come into contact with the base core 310 and the display case 120. One end of the second spring 330 may come into contact with the lateral side of the base core 310. The other end of the second spring 330 may come into contact with a cross section formed on the rear surface of the display case 120. Here, the cross section may be understood as a surface defining the end of the second groove.

The second spring 330 may be disposed in a left-right direction. The second spring 330 may be formed on the second rail. The second rail may be formed as the second rail cover 260 is coupled to the display case 120. The second rail may be formed by the second groove, formed on the rear surface of the display case 120, and the groove formed on the second rail cover 260.

The second spring 330 may be compressed and expanded by the base core 310 which is moved based on the current flowing through the coil 311. The second spring 330 may be compressed and expanded relative to the first spring. For example, the second spring 330 may be expanded when the first spring 220 corresponding thereto is compressed. The second spring 330 may be compressed when the first spring 220 corresponding thereto is expanded.

A natural frequency of the second spring 330 may be equal to a natural frequency of the first spring 220.

A leaf spring 230 may be coupled to the display 110. The leaf spring 230 may be bolt-fastened to a first boss, so as to be secured to the display 110. The first boss may protrude toward a rear case 150 from the rear surface of the display 110. The first boss may pass through the display case 120 and the arm plate 200. Each of the display case 120 and the arm plate 200 may have a hole through which the first boss may pass.

The leaf spring 230 may restrict the movement of the display 110. The leaf spring 230 may restrict the movement of the display 110 by supporting the display 110 forwardly.

The force sensor 240 may be coupled to the display 110. The force sensor 240 may be bolt-fastened to the second boss, so as to be secured to the display 110. The second boss may protrude toward the rear case 150 from the rear surface of the display 110. The second boss may pass through the display case 120 and the arm plate 200. Each of the display case 120 and the arm plate 200 may have a hole through which the second boss may pass.

Upon sensing pressure applied by a user touching the display 110, the force sensor 240 may generate an electrical signal. The solenoid module 300 may be driven based on the signal generated by the force sensor 240.

The force sensor 240 may have a plate shape. The force sensor 240 may function as a leaf spring as well as a sensor. The force sensor 240 may be elastically coupled to the display 110, with a center portion being bent toward the display 110, and may support the display 110 forwardly, so as to restrict the movement of the display 110.

The first rail cover 250 may be coupled to the display case 120. The first rail cover 250 may form a rail, in which the first spring 220 is received, together with the first groove formed on one surface of the display case 120. The first rail cover 250 may be coupled to the display case 120 by bolting, while covering the first groove formed on the rear surface of the display case 120. The first rail may be formed as the first rail cover 250 covers the first groove.

The second rail cover 260 may be coupled to the display case 120. The second rail cover 260 may form a rail, in which the second spring 330 is received, together with the second groove formed on one surface of the display case 120. The second rail cover 260 may be coupled to the display case 120 by bolting, while covering the second groove formed on the rear surface of the display case 120. The second rail may be formed as the second rail cover 260 covers the second groove.

A first printed circuit board (PCB) 130 may be referred to as a haptic PCB. A plurality of elements for haptic driving may be mounted on the first PCB 130. A processor, an interface, a power supply, a memory, and the like may be mounted on the first PCB. The solenoid module 300 and the force sensor 240 may be electrically connected to the first PCB 130. The first PCB 130 may be coupled to at least one of the display 110, the display case 120, the arm plate 200, and the first rail cover 250.

A second PCB 140 may be referred to as a main PCB. A plurality of elements for driving the display 110 may be mounted on the second PCB 140. A processor, an interface, a power supply, a memory, and the like may be mounted on the second PCB 140. The display 110 and the first PCB 130 may be electrically connected to the second PCB 140. The second PCB 140 may be coupled to at least one of the display 110, the display case 120, the arm plate 200, the first rail cover 250, and the first PCB 130.

Meanwhile, depending on embodiments, the vehicle display apparatus 100 may include only one PCB. In this case, the one PCB may serve as both the first PCB 130 and the second PCB 140.

The rear cover 150 may be coupled to at least one of the display 110 and the display case 120. The rear cover 150 may be bolt-fastened to a boss protruding toward the rear cover 150 from the rear surface of the display 110. The rear cover 150 may be bolt-fastened to a boss protruding toward the rear cover 150 from the rear surface of the display case 120.

FIGS. 8A to 8E are diagrams referred to in the description of a connection relationship of each of components of a vehicle display apparatus according to an embodiment of the present disclosure.

Figure 8A:
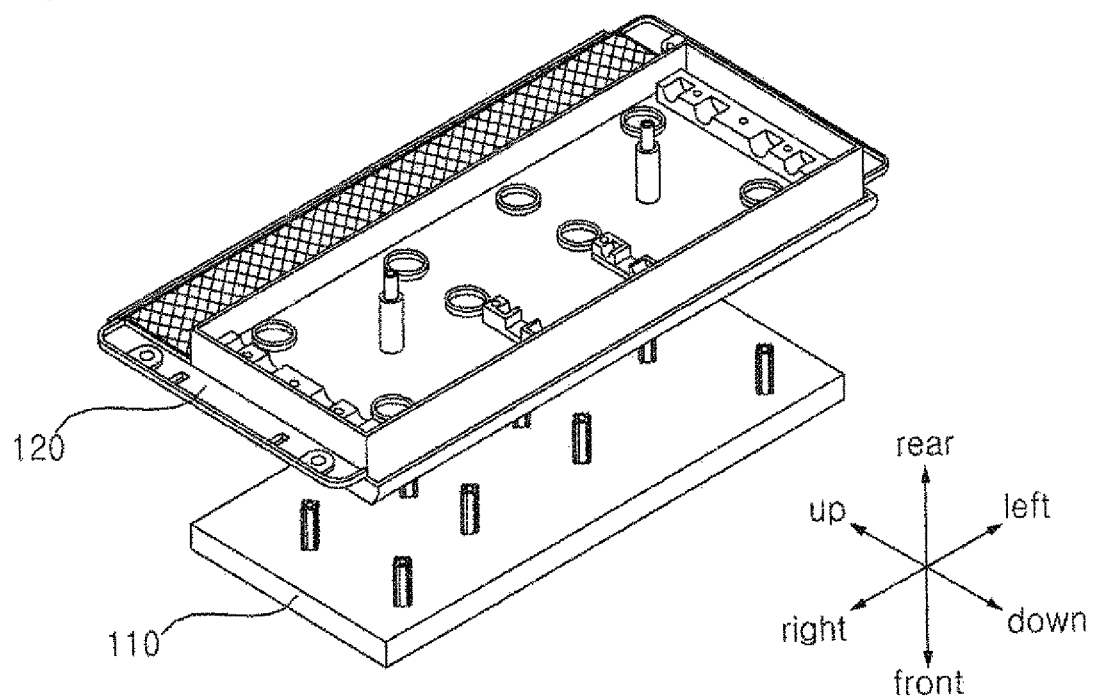
FIGS. 8A to 8E are diagrams referred to in the description of a connection relationship of each of components of a vehicle display apparatus according to an embodiment of the present disclosure.

As illustrated in FIG. 8A, the display 110 may be seated on a front surface of the display case 120. The rear surface of the display 110 may come into contact with the front surface of the display case 120. A plurality of bosses may be formed on the rear surface of the display 110. A plurality of holes may be formed on the display case 120. At least some of the bosses formed on the rear surface of the display 110 may pass through the display case 120 via the holes formed on the display case 120.

Figure 8B:
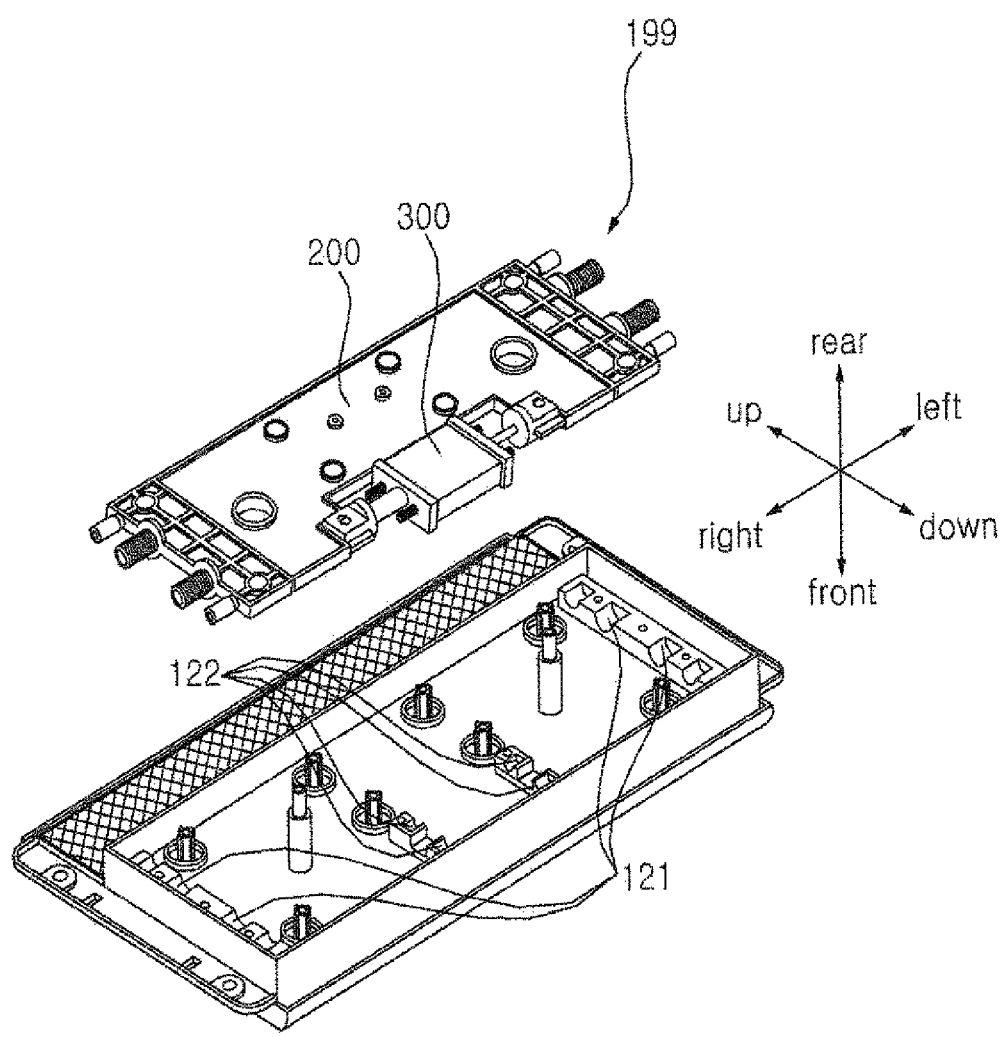

As illustrated in FIG. 8B, an arm plate assembly 199 may be seated on the rear surface of the display case 120. The arm plate assembly 199 may refer to a module having the solenoid module 300, the first spring 220, the bushing 210, and the second spring 330 being coupled to the arm plate 200. A plurality of holes may be formed on the arm plate 200. At least some of the bosses formed on the rear surface of the display 100 may pass through the arm plate 200 via the holes formed on the arm plate 200.

Figure 8C:
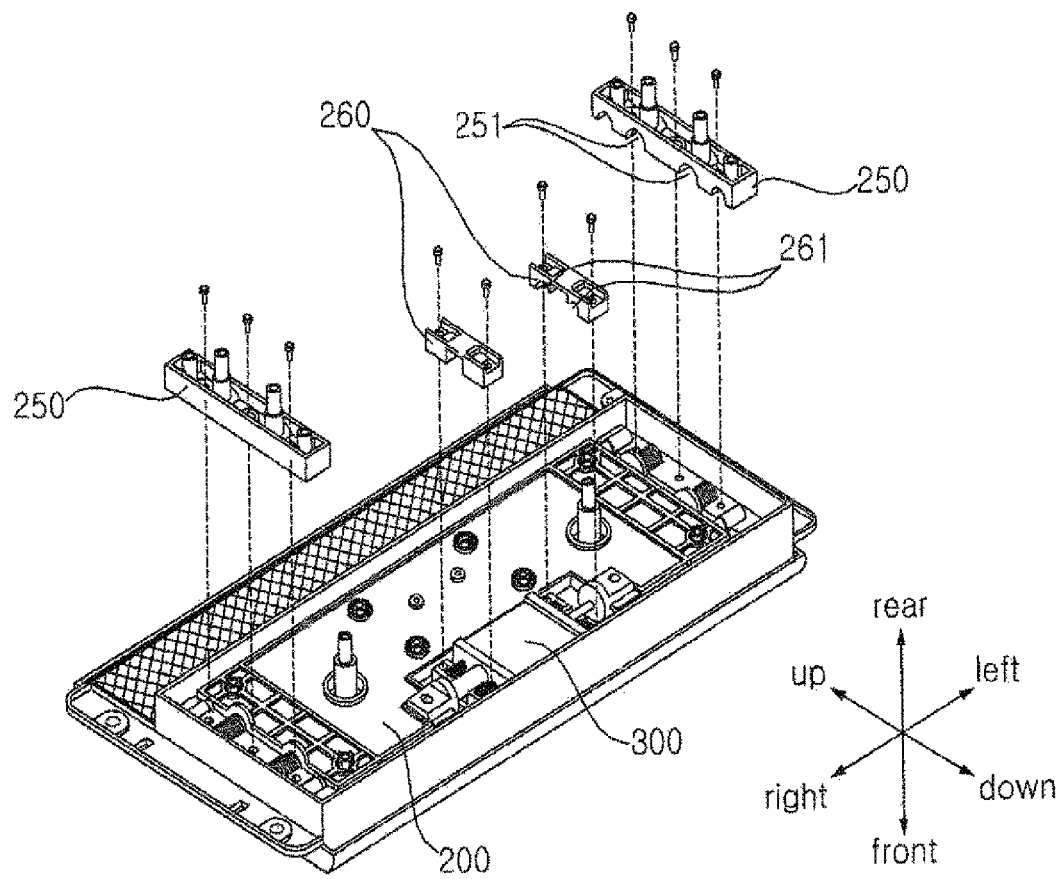

As illustrated in FIG. 8C, while the arm plate assembly 199 is seated on the rear surface of the display case 120, the first rail cover 250 and the second rail cover 260 may be coupled to the display case 120. At least one hole may be formed on the first rail cover 250. A bolt may be coupled to the display case 120 by passing through the hole formed on the first rail cover 250. At least one hole may be formed on the second rail cover 260. The bolt may be coupled to the display case 120 by passing through the hole formed on the second rail cover 260.

Figure 8D:
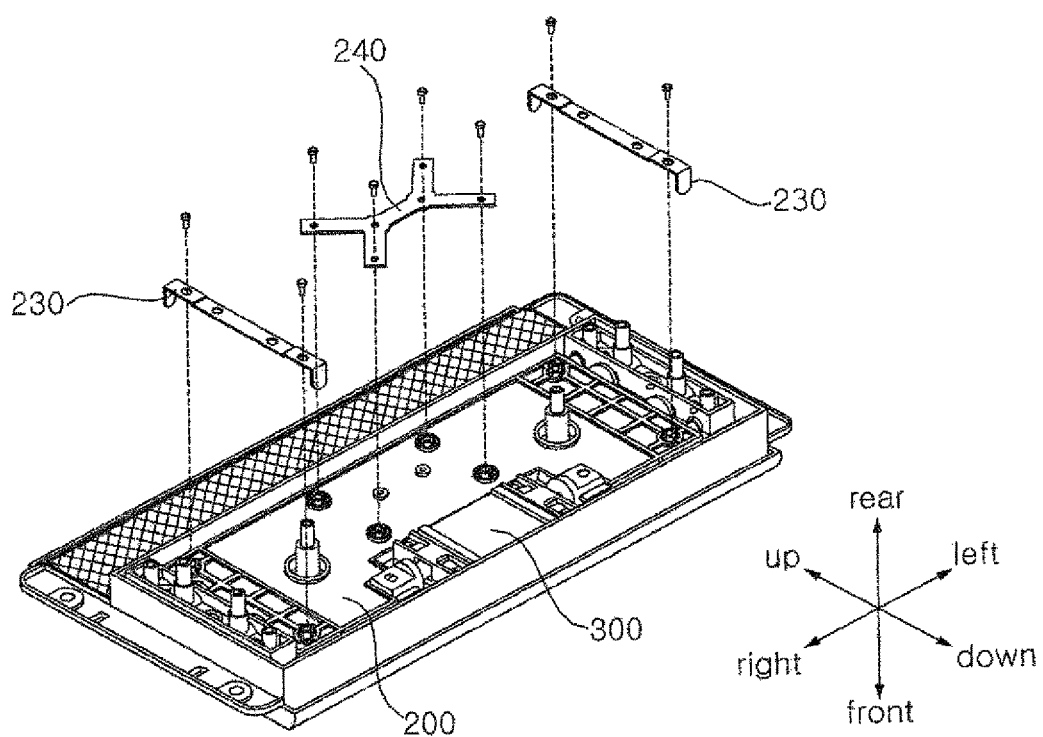
Figure 8E:
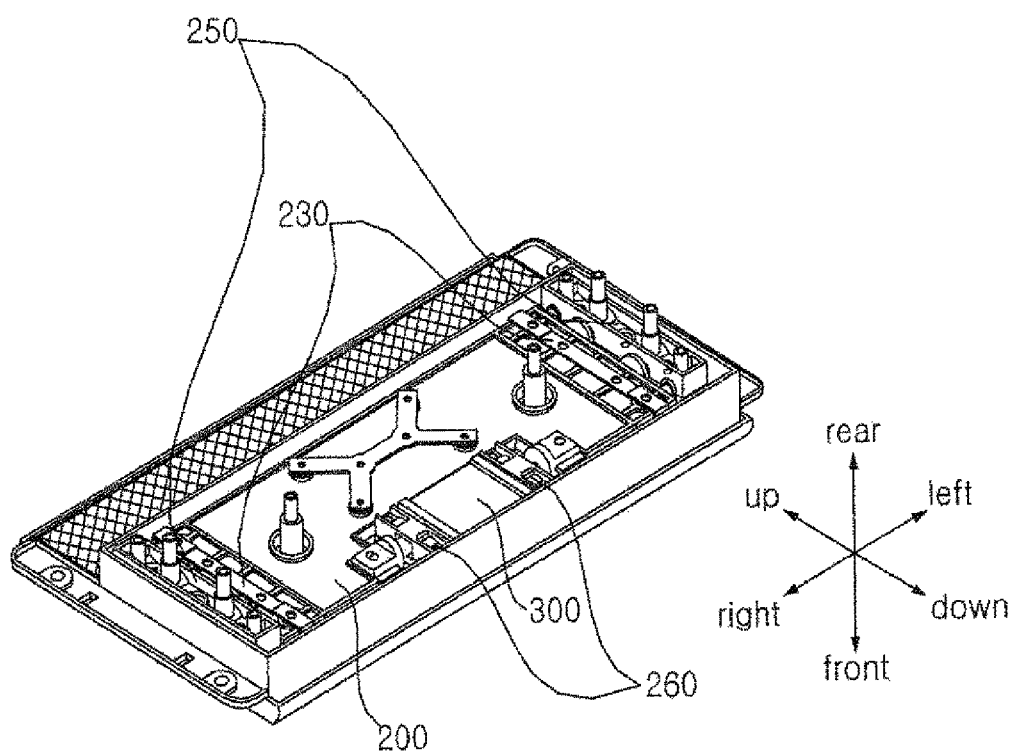

As illustrated in FIGS. 8D and 8E, the leaf spring 230 may be bolt-fastened to the first boss protruding from the rear surface of the display 110. The force sensor 240 may be bolt-fastened to the second boss protruding from the rear surface of the display 110.

While the leaf spring 230 and the force sensor 240 are fastened, the first PCB 130 and the second PCB 140 may be coupled to at least one of the display 110, the display case 120, the arm plate 200, and the first rail cover 250. While the first PCB 130 and the second PCB 140 are coupled, the rear cover 150 may be coupled to at least one of the display 110 and the display case 120.

Figure 9A:
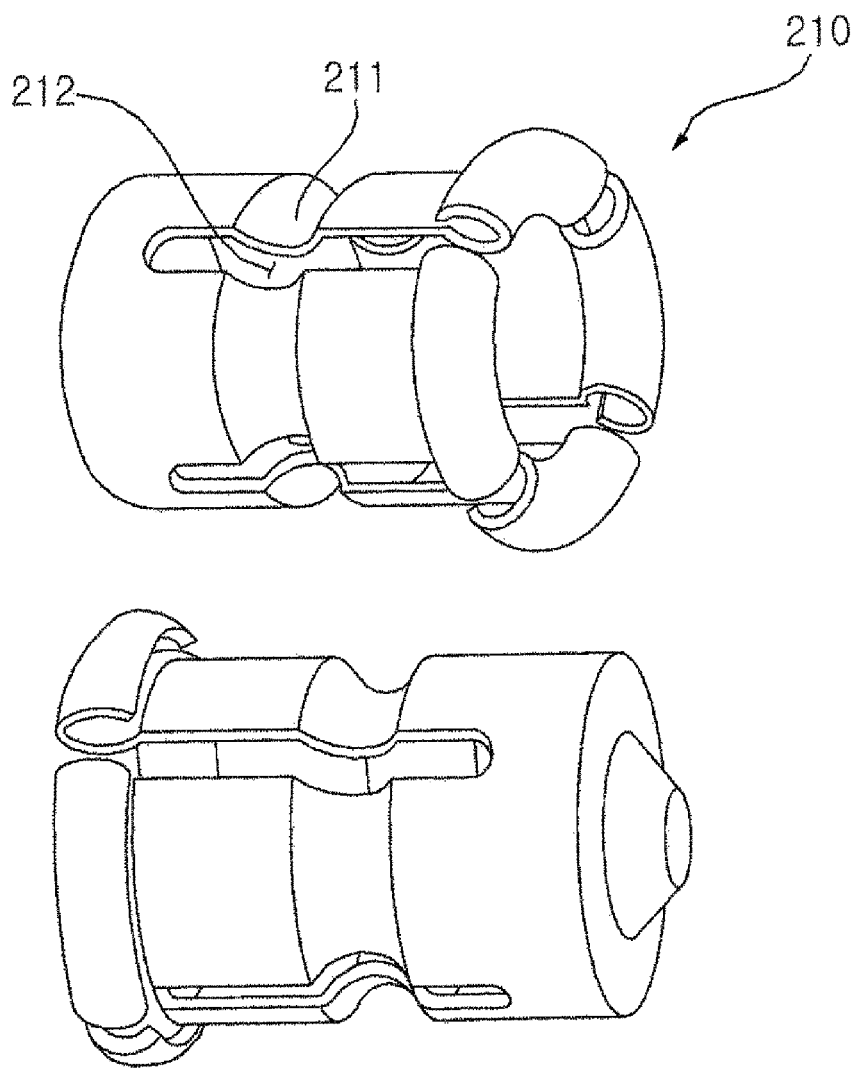
FIGS. 9A and 9B are diagrams referred to in the description of a bushing according to an embodiment of the present disclosure.
Figure 9B:
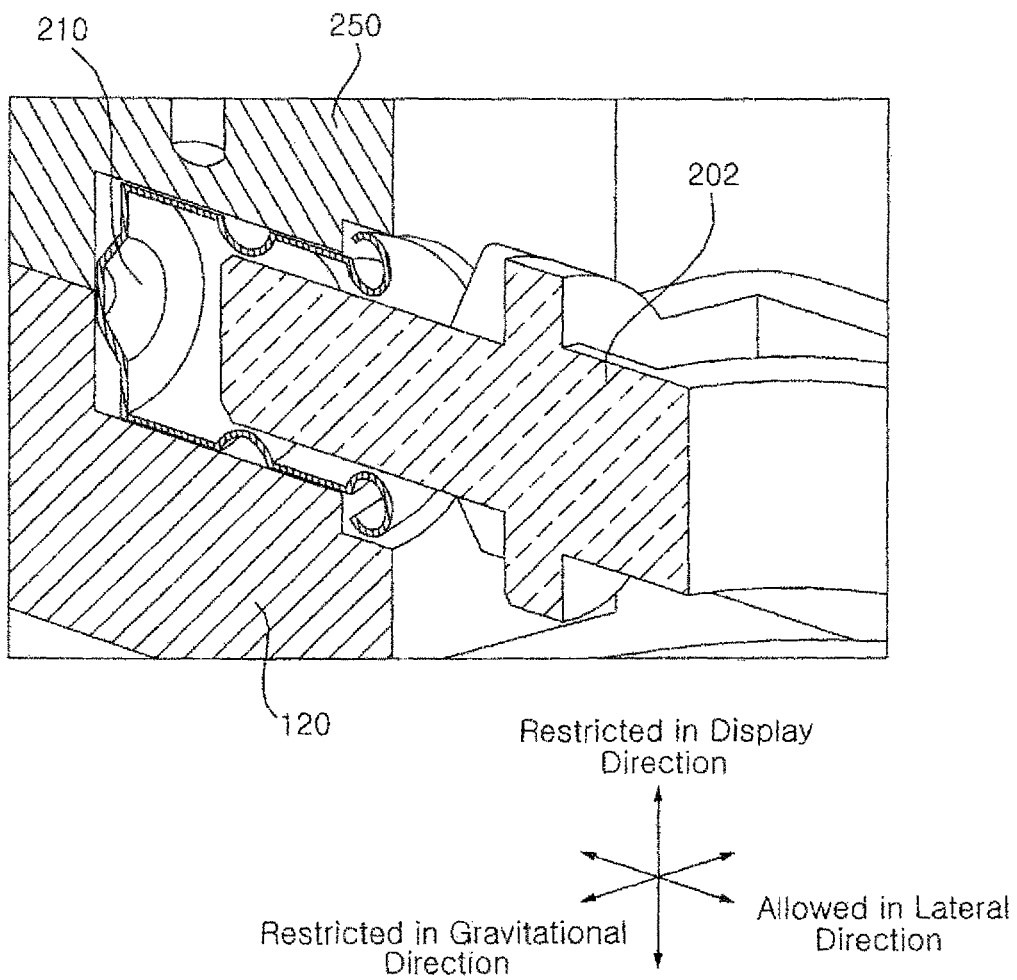

FIGS. 9A and 9B are diagrams referred to in the description of a bushing according to an embodiment of the present disclosure.

FIG. 9A illustrates a view of the bushing 210 as seen from different angles. FIG. 9B is a cutaway view of a coupled bushing 210.

Referring to FIGS. 9A and 9B, the busing 210 may be inserted into the second protruding part 202 extending outwardly from a lateral side of the arm plate 200. When the vehicle display apparatus 100 is fully assembled, the busing 210 may be disposed between the display case 120 and the first rail cover 250. At least one groove 211 may be formed on the bushing 210 along a circumference thereof, and at least one slot 212 may be formed in the left-right direction. The second protruding part 202 may have protrusions corresponding to shapes of the groove 211 and the slot 212 of the bushing 210. As the protrusions are inserted into the groove 211 and the slot 212 of the bushing 210, the bushing 210 may suppress torque from being generated in the arm plate 200. For example, the bushing 210 may restrict an up-and-down movement and a back-and-forth movement of the arm plate 200. Accordingly, the arm plate 200 may move only in the left-right direction. Further, it is possible to prevent the first spring 220 from sagging due to gravity.

Meanwhile, the up-down direction may be the direction of gravity, and the front-rear direction may be a direction toward the display.

Meanwhile, the solenoid module (300 of FIG. 6A) may be disposed so that a center of gravity of the solenoid module may correspond to a center of gravity of the vehicle display apparatus 100. For example, the force sensor (240 of FIG. 5) of the vehicle display apparatus 100 may be biased leftward or rightward, rather than being disposed at the center in the left-right direction of the vehicle display apparatus 100. In this case, the solenoid module 230 may be disposed so that a point of the center of gravity of the solenoid module 300 may coincide with a point of the center of gravity in the left-right direction of the display apparatus 100 and a point of the center of gravity in the up-down direction thereof.

While the force sensor 240 of the vehicle display apparatus 100 is disposed at the center in the left-right direction of the vehicle display apparatus 100, the force sensor 240 may be biased upwardly or downwardly in the up-down direction. In this case, the solenoid module 300 may be disposed so that a point of the center of gravity of the solenoid module 300 may coincide with a point of the center of gravity in the left-right direction of the display apparatus 100.

The present invention can be realized as a computer-readable code written on a computer-readable recording medium. The computer-readable recording medium may be any type of recording device in which data is stored in a computer-readable manner. Examples of the computer-readable recording medium include a Hard Disk Drive (HDD), a Solid State Disk (SSD), a Silicon Disk Drive (SDD), a ROM, a RAM, a CD-ROM, a magnetic tape, a floppy disc, an optical data storage, and a carrier wave (e.g., data transmission through the Internet). Further, the computer may also include a processor or a controller. The above embodiments are therefore to be construed in all aspects as illustrative and not restrictive. The scope of the invention should be determined by the appended claims and their legal equivalents, and all changes coming within the meaning and equivalency range of the appended claims are intended to be embraced therein.

EXPLANATION OF REFERENCE NUMERALS

100: Vehicle display
120: Display case
200: Arm plate
300: Solenoid module

The invention claimed is:

1. A vehicle display apparatus comprising:
a display case;
an arm plate elastically coupled to the display case; and
a solenoid module,
wherein the solenoid module comprises:
a moving core having a rod shape and both ends coupled to the arm plate, and
a base core elastically coupled to the display case and including a coil that is wound in a first direction to surround at least a portion of the moving core,
wherein the moving core is configured to vibrate based on a current flowing through the coil, and
wherein the base core is configured to vibrate in a direction opposite to a direction in which the moving core moves.

2. The vehicle display apparatus of claim 1, further comprising at least a pair of first springs inserted into a protruding part extending outwardly from a lateral side of the arm plate.

3. The vehicle display apparatus of claim 2, further comprising a first rail cover forming a rail, in which the pair of first springs are received, together with a first groove located on one surface of the display case.

4. The vehicle display apparatus of claim 2, further comprising at least a pair of second springs inserted into a protruding part extending outwardly from a lateral side of the base core and configured to contact the base core and the display case.

5. The vehicle display apparatus of claim 4, further comprising a second rail cover forming a rail, in which the pair of second springs are received, together with a second groove located on one surface of the display case.

6. The vehicle display apparatus of claim 4, wherein:
the pair of first springs are compressed and expanded by the moving core and the arm plate, the moving core and the arm plate configured to move based on the current flowing through the coil, and
the pair of second springs are compressed and expanded relative to the pair of first springs.

7. The vehicle display apparatus of claim 4, wherein a natural frequency of a first spring of the pair of first springs is equal to a natural frequency of a second spring of the pair of second springs.

8. The vehicle display apparatus of claim 1, wherein the moving core comprises:
a shaft passing through the base core;
a first head extending from a first end of the shaft and fastened to the arm plate; and
a second head extending from a second end of the shaft and fastened to the arm plate.

9. The vehicle display apparatus of claim 1, further comprising:
a display seated on the display case and having at least one first boss and at least one second boss that are provided at a rear surface of the display case; and
a leaf spring that is coupled to the first boss and that passes through the display case and the arm plate, so as to be secured to the display.

10. The vehicle display apparatus of claim 9, wherein the leaf spring is configured to restrict movement of the display.

11. The vehicle display apparatus of claim 9, further comprising a force sensor that is coupled to the second boss and that passes through the display case and the arm plate, so as to be secured to the display.

12. The vehicle display apparatus of claim 11, wherein the solenoid module is driven based on a signal generated by the force sensor.

13. The vehicle display apparatus of claim 11, wherein the force sensor has a plate shape, is elastically coupled to the display, and has a center portion bent toward the display, so as to restrict movement of the display.

14. The vehicle display apparatus of claim 1, further comprising at least one bushing that is inserted into a protruding part extending outwardly from a lateral side of the arm plate and that is configured to suppress torque from being generated in the arm plate.

15. The vehicle display apparatus of claim 1, wherein the solenoid module is configured to generate a magnetic force based on the current flowing through the coil.

16. The vehicle display apparatus of claim 15, wherein the solenoid module is configured to change a direction of the magnetic force based on the current flowing through the coil.

17. The vehicle display apparatus of claim 16, wherein, based on the direction of the magnetic force being changed, a movement direction of each of the moving core and the base core is changed.

18. The vehicle display apparatus of claim 17, wherein, based on the direction of the magnetic force being changed at a predetermined interval, the movement direction of each of the moving core and the base core is changed at the predetermined interval.

* * * * *